March 25, 1924. Re. 15,800

O. H. GOETZ

AUTOMOBILE BUMPER

Original Filed Aug. 6, 1921

Witness.
W. G. McKnight

Inventor:
Oscar H. Goetz.
by Burton & Burton
his Attys.

Reissued Mar. 25, 1924. Re. 15,800

UNITED STATES PATENT OFFICE.

OSCAR H. GOETZ, OF BRIDGEPORT, CONNECTICUT, ASSIGNOR TO STEWART-WARNER SPEEDOMETER CORPORATION, OF CHICAGO, ILLINOIS, A CORPORATION OF VIRGINIA.

AUTOMOBILE BUMPER.

Original No. 1,394,893, dated October 25, 1921, Serial No. 490,299, filed August 6, 1921. Application for reissue filed April 27, 1923. Serial No. 635,152.

*To all whom it may concern:*

Be it known that I, OSCAR H. GOETZ, a citizen of the United States, residing at Bridgeport, in the county of Fairfield and State of Connecticut, have invented new and useful Improvements in Automobile Bumpers, of which the following is a specification, reference being had to the accompanying drawings, forming a part thereof.

The purpose of this invention is to provide an improved bumper for automobiles of the spring bar type having duplex impact bar. It consists in the elements and features of construction shown and described, as indicated in the claims.

In the drawings:—

Figure 1:
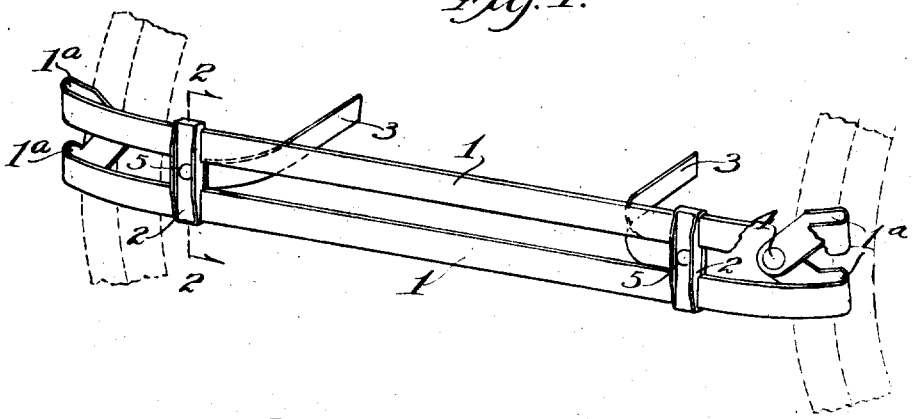
Figure 1 is a perspective view of a bumper embodying this invention.
Figure 2:
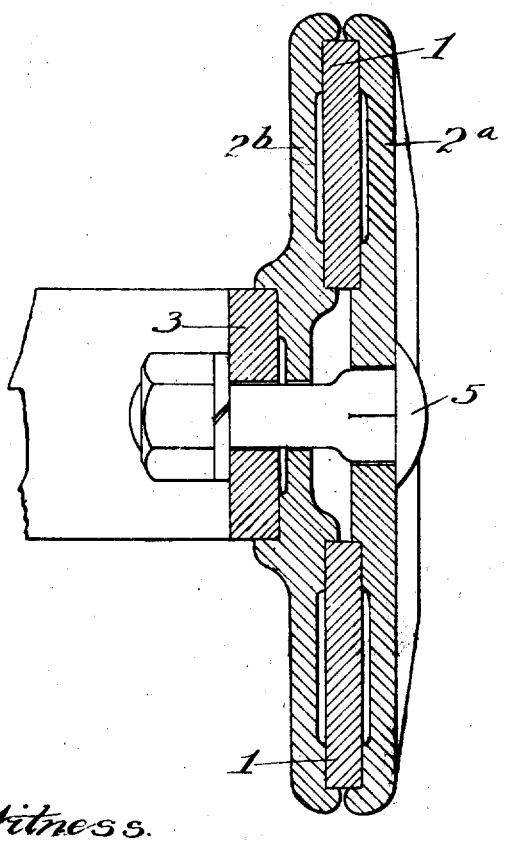
Figure 2 is a section at the line, 2—2, on Figure 1.

The bumper shown comprises an impact member consisting of two transversely extending impact bars, 1, 1, both set vertically edgewise in substantially the same vertical plane, and preferably both having their opposite ends reflexed rearward so as to form end loops as seen at $1^a$, the reflexed parts being preferably both flexed vertically, one upward and the other downward, to bring them together at a point about midway between the plane of the upper edge of the upper bar, and that of lower edge of the lower bar. The two bars 1, 1, are spaced apart a small distance, preferably not exceeding the vertical width of each bar, and they are secured together by vertical cross ties, 2, 2, to which the supporting arms, 3, 3, of the bumper are secured for attaching the bumper to the vehicle. Preferably the vertically flexed ends of the bars are lapped one upon the other and secured together by bolts or rivets, 4. Preferably the vertical cross ties, 2, are two-membered clamps, the two members, $2^a$, $2^b$, being clamped together for clamping the impact bars, 1, 1, between them, by means of a clamping bolt, 5, which serves also for securing the suporting arms, 3, to the cross ties, and thereby to the impact member.

I claim:—

1. An automobile bumper comprising an impact member having two horizontal transversely extending bars, set vertically edgewise in substantially the same vertical plane, both being similarly reflexed rearward at both ends, and having the reflexed parts at each end flexed vertically toward each other and united, whereby there are formed double-barred hooks for guarding the wheels; and supporting arms secured to both said impact bars at points inward from the end loops respectively.

2. In combination with the construction defined in claim 1, foregoing, vertical ties by which the horizontal bars are secured together at points inward from said reflexed end parts, the supporting arms being secured to said vertical ties respectively.

3. An automobile bumper comprising an impact member consisting of two horizontal transversely extended bars set vertically edgewise in substantially the same vertical plane; inflexible ties extending across both said bars at a substantial distance inward from their opposite ends for securing said bars rigidly together and definitely spacing them apart, and supporting arms of flat spring bar set vertically edgewise secured to said ties, respectively, and curved horizontally in opposite directions from their securement to said vertical ties and from their said curves extending for attachment to the vehicle; whereby the shock of impact upon the end portions of either of the impact bars outward from the ties tends to torsionally flex the curved end portion of the supporting arm, stiffening it against flexure in the plane of different curvature.

In testimony whereof, I have hereunto set my hand at Bridgeport, Conn., this 17th day of April, 1923.

OSCAR H. GOETZ.